United States Patent
Bahn et al.

(10) Patent No.: US 9,688,843 B2
(45) Date of Patent: Jun. 27, 2017

(54) POLYCARBONATE RESIN COMPOSITION

(71) Applicant: LG CHEM, LTD., Seoul (KR)

(72) Inventors: Hyong Min Bahn, Daejeon (KR); Min Jeong Kim, Daejeon (KR); Jung Jun Park, Daejeon (KR); Moo Ho Hong, Daejeon (KR); Young Young Hwang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 48 days.

(21) Appl. No.: 14/424,365

(22) PCT Filed: Jul. 1, 2014

(86) PCT No.: PCT/KR2014/005840
§ 371 (c)(1),
(2) Date: Feb. 26, 2015

(87) PCT Pub. No.: WO2015/002428
PCT Pub. Date: Jan. 8, 2015

(65) Prior Publication Data
US 2015/0210831 A1    Jul. 30, 2015

(30) Foreign Application Priority Data

Jul. 1, 2013 (KR) .................. 10-2013-0076442
Jun. 23, 2014 (KR) .................. 10-2014-0076341

(51) Int. Cl.
C08K 5/524     (2006.01)
C08K 5/13      (2006.01)
C08K 5/5333    (2006.01)

(52) U.S. Cl.
CPC ............. *C08K 5/524* (2013.01); *C08K 5/13* (2013.01); *C08K 5/5333* (2013.01)

(58) Field of Classification Search
CPC .................................. C08K 5/13; C08K 5/524
See application file for complete search history.

(56) References Cited

U.S. PATENT DOCUMENTS

| | | | | |
|---|---|---|---|---|
| 4,495,345 A | * | 1/1985 | Kawakami | C08L 69/00 528/174 |
| 6,340,737 B2 | * | 1/2002 | Ogawa | 528/196 |
| 7,135,545 B2 | * | 11/2006 | Yang | G02B 1/041 264/176.1 |
| 2002/0040081 A1 | | 4/2002 | Stein et al. | |
| 2006/0004154 A1 | * | 1/2006 | DeRudder | C08F 279/04 525/469 |
| 2007/0299168 A1 | * | 12/2007 | Ariki | C08K 5/103 524/91 |

FOREIGN PATENT DOCUMENTS

| | | |
|---|---|---|
| CN | 101469119 A | 7/2009 |
| CN | 102686671 A | 4/2014 |
| JP | 06-145491 A | 5/1994 |
| JP | 1994-166808 A | 6/1994 |
| JP | 1997-165505 A | 6/1997 |
| JP | 1998-211642 A | 8/1998 |
| JP | 2003-301101 A | 10/2003 |
| JP | 2008-291055 A | 12/2008 |
| JP | 2011-105847 A | 6/2011 |
| KR | 10-1998-0027067 A | 7/1998 |
| KR | 10-2002-0063657 A | 8/2002 |
| KR | 10-0836363 B1 | 6/2008 |
| KR | 10-2010-0059980 A | 6/2010 |
| KR | 10-2012-0101702 A | 9/2012 |
| WO | 2012-106425 A1 | 8/2012 |

OTHER PUBLICATIONS

BASF Irganox 1010 Technical Data Sheet, Sep. 2010.*
Doverphos S-9228 Technical Data Sheet, Jun. 2010.*

* cited by examiner

*Primary Examiner* — Christopher M Rodd
(74) *Attorney, Agent, or Firm* — Dentons US LLP

(57) ABSTRACT

Disclosed is a polycarbonate resin a composition. The polycarbonate resin composition may simply and exactly improve appearance properties such as yellow index (Y.I), haze and the like, and thermal stability during a high-temperature process, and provide processability by reducing gas generation during molding, through provision of a relational formula of addition amounts of a hindered phenol-based compound and a phosphite-based compound which function as antioxidants when mixed with the polycarbonate resin.

8 Claims, No Drawings

POLYCARBONATE RESIN COMPOSITION

This application is a National Stage Entry of International Application No. PCT/KR2014/005840, filed Jul. 1, 2014 and claims the benefit of Korean Application Nos. 10-2013-0076442, filed on Jul. 1, 2013, and 10-2014-0076341, filed Jun. 23, 2014, all of which are hereby incorporated by reference in their entirety for all purposes as if fully set forth herein.

TECHNICAL FIELD

The present invention relates to a polycarbonate resin composition. More particularly, the present invention relates to a polycarbonate resin composition which may simply and exactly improve appearance properties such as yellow index (Y.I), haze and the like, and thermal stability during a high-temperature process, and provide processability by reducing gas generation during molding, through provision of a relational formula of addition amounts of a hindered phenol-based compound and a phosphite-based compound which function as antioxidants when mixed with the polycarbonate resin.

BACKGROUND ART

Polycarbonate resins are known as resins having superior impact resistance, transmittance, strength, flame retardancy, electrical properties and heat resistance, and are broadly used to manufacture vehicles and other molded electrical and electronic products, and a demand for polycarbonate resins are increasing. However, polycarbonate resins have drawbacks such as high melt viscosity, poor moldability, poor color stability during a high-temperature process, and impact resistance greatly dependent on thickness thereof.

In particular, to obtain thinner and larger products than conventional products, molding at higher temperature than conventional molding temperature is required, and improvement of thermal stability and appearance properties such as yellow index (Y.I) and haze is required to improve poor color stability.

Accordingly, so as to secure appearance properties, thermal stability and the like during a high-temperature process, addition of hindered phenol-based compounds, phosphite-based compounds, polyoxyethylene glycol-based compounds or the like has been suggested. As literature related therewith, there are Korean Patent No. 2012-0101702 (published on Sep. 14, 2012), Chinese Patent No. 103351589 (published on Oct. 16, 2013) and the like.

However, there is still a demand for a polycarbonate resin composition which may simply and exactly improve appearance properties such as yellow index (Y.I), haze and the like, and thermal stability during a high-temperature process, and provide processability.

DISCLOSURE

Technical Problem

Therefore, the present invention has been made in view of the above problems, and it is one object of the present invention to provide a polycarbonate resin composition which may simply and exactly improve appearance properties such as yellow index (Y.I), haze and the like, and thermal stability during a high-temperature process, and provide processability by reducing gas generation during molding, through provision of a relational formula of addition amounts of a hindered phenol-based compound and a phosphite-based compound which function as antioxidants when mixed with the polycarbonate resin, thus completing the present invention.

That is, it is another object to provide a polycarbonate resin composition comprising an interaction formula of addition amounts of a hindered phenol-based compound and a phosphite-based compound which function as antioxidants when mixed with a polycarbonate resin.

Technical Solution

In accordance with one aspect of the present invention, provided is a polycarbonate resin composition comprising a polycarbonate resin, a hindered phenol-based compound and a phosphite-based compound, wherein the polycarbonate resin composition comprises the hindered phenol-based compound and the phosphite-based compound in a content range satisfying Formula 1 below and Formula 2 below based on 100 parts by weight of the polycarbonate resin:

$$0.6 \leq y/(x+y) \leq 0.9 \quad \text{[Formula 1]}$$

$$0.05 \leq x+y \leq 0.5 \quad \text{[Formula 2]}$$

wherein x is parts by weight of the hindered phenol-based compound and y is parts by weight of the phosphite-based compound.

Advantageous Effects

As apparent from the fore-going, the present invention advantageously provides a polycarbonate resin composition which may simply and exactly improve appearance properties such as yellow index (Y.I), haze and the like, and thermal stability during a high-temperature process, and provide processability by reducing gas generation during molding, through provision of a relational formula of addition amounts of a hindered phenol-based compound and a phosphite-based compound which function as antioxidants when mixed with the polycarbonate resin.

BEST MODE

Hereinafter, the present invention will be described in detail.

The present invention is characterized by provision of a polycarbonate resin composition which may simply and exactly improve appearance properties such as yellow index (Y.I), haze and the like, and thermal stability during a high-temperature process, and provide processability by reducing gas generation during molding.

In particular, the polycarbonate resin composition according to the present invention comprises a polycarbonate resin, a hindered phenol-based compound and a phosphite-based compound, wherein the polycarbonate resin composition comprises the hindered phenol-based compound and the phosphite-based compound in a content range satisfying Formula 1 below and Formula 2 below based on 100 parts by weight of the polycarbonate resin.

$$0.6 \leq y/(x+y) \leq 0.9 \quad \text{[Formula 1]}$$

$$0.05 \leq x+y \leq 0.5 \quad \text{[Formula 2]}$$

wherein x is parts by weight of the hindered phenol-based compound and y is parts by weight of the phosphite-based compound.

As an embodiment, Formula 1 may be a interaction formula between the hindered phenol-based compound and the phosphite-based compound, in which yellow index difference (ΔYI) measured with ASTM D1925 is 0.20 or less and haze measured with ASTM D1003 is 0.20 or less, when the composition is processed at 280° C. and 320° C.

As a specific embodiment, Formula 1 may be an interaction formula between the hindered phenol-based compound and the phosphite-based compound, wherein yellow index difference (ΔYI) measured with ASTM D1925 is 0.10 to 0.20 and haze measured with ASTM D1003 is 0.09 to 0.20, when the composition is processed at 280° C. and 320° C.

In addition, as an embodiment, Formula 2 may be a interaction formula between the hindered phenol-based compound and the phosphite-based compound, in which yellow index difference (ΔYI) measured with ASTM D1925 is 0.10 to 0.20, haze measured with ASTM D1003 is 1.17 or less, and a total organic compound (VOC, 300° C., 20 min) is 350 ppm or less, when the composition is processed at 280° C. and 320° C.

As a specific embodiment, Formula 2 may be a interaction formula between the hindered phenol-based compound and the phosphite-based compound, wherein yellow index difference (ΔYI) measured with ASTM D1925 is 0.12 to 0.18, haze measured with ASTM D1003 is 0.09 to 1.17, and a total organic compound (VOC, 300° C., 20 min) is 350 ppm or less, when the composition is processed at 280° C. and 320° C.

As an embodiment, the hindered phenol-based compound may be a compound wherein yellow index difference (ΔYI) with measured ASTM D1925 is 0.10 to 0.20 and a total organic compound (VOC, 300° C., 20 min) is 350 ppm or less.

As another embodiment, in the hindered phenol-based compound, $T_{10\%}$(° C.) measured according to an ASTM E2402 method may be 300° C. or more, 300 to 375° C., or 349 to 365° C.

As another embodiment, the hindered phenol-based compound may be one or more selected from pentaerythritol tetrakis[3-(3,5-di-t-butyl-4-hydroxyphenyl)propionate], and 1,3,5-trimethyl-2,4,6-tris(3,5-di-t-butyl-4-hydroxy benzyl) benzene.

As a specific embodiment, the hindered phenol-based compound may be Irganox-1010 available from BASF Corp. or ADK Stab AO-330 available from ADEKA Corp.

As an embodiment, in the phosphite-based compound, yellow index difference (ΔYI) measured with ASTM D1925 is 0.10 to 0.20 and haze measured with ASTM D1003 is 1.17 or less, and a total organic compound (VOC, 300° C., 20 min) is 350 ppm or less, when the composition is processed at 280° C. and 320° C.

As another embodiment, in the phosphite-based compound, $T_{10\%}$(° C.) measured according to an ASTM E2402 method may be 300° C. or more, 300 to 375° C., or 337 to 362° C.

As yet another embodiment, the phosphite-based compound may be one or more selected from bis(2,4-di-t-butylphenyl)pentaerythritol diphosphite, and bis(2,4-dicumylphenyl)pentaerythritol diphosphite.

As a specific embodiment, the phosphite-based compound may be ADK Stab PEP-24 available from ADEKA Corp. or DoverPhos S-9228 available from Dover Chemical Corp.

As an embodiment, the polycarbonate resin may be an aliphatic or aromatic resin, and melt viscosity thereof may be 10 to 160 g/min, 10 to 80 g/min or 10 to 30 g/min.

As an embodiment, average molecular weight (Mw) of the polycarbonate resin may be 14,000 to 50,000 g/mol, 20,000 to 50,000 g/mol, or 30,000 to 50,000 g/mol.

The composition may comprise one or more additives selected from a conventionally used lubricant, light stabilizer, and anti-hydrolysis agent.

The composition may be applied when injection or extrusion molded products are manufactured.

Now, the present invention will be described in more detail with reference to the following examples. These examples are provided only for illustration of the present invention and should not be construed as limiting the scope and spirit of the present invention.

Example 1

Based on 100 parts by weight of a polycarbonate resin, where melt viscosity is 22 g/min, having an average molecular weight of 41,000 g/mol, 0.05 parts by weight (x) of Irganox 1010 (corresponding to B1 in Table 1) having $T_{10\%}$(° C.) of 365° C. measured according to an ASTM E2402 method as a hindered phenol-based compound and 0.15 parts by weight (y) of PEP-24 (corresponding to C1 in Table 1) having $T_{10\%}$(° C.) of 337° C. measured according to an ASTM E2402 method as a phosphite-based compound were added to a 290° C. cylinder, where a calculated value of Formula 1 is 0.75 and a calculated value of Formula 2 is 0.20, and then prepared in a pellet form using a twin-screw extrusion kneader.

The obtained polycarbonate resin composition, which was a pellet form, was injection-molded at 280° C. and 320° C., respectively, to obtain a specimen of 40×80×3 mm (width× length×thickness). Physical properties of the specimen were measured as follows. Results are summarized in Table 2 below.

<Physical Property Measurement>
Haze: ASTM D1003
Yellow index (YI): ASTM D1925
Yellow index difference (ΔYI)=YI (320° C.)−YI (280° C.)
Total volatile organic compound (VOC): purge and trap gas chromatography-mass spectrometry (during 20 minutes at 300° C.)

Example 2

An experiment identical to Example 1 was performed, except that 0.08 parts by weight of DovorPhos S-9228 (y) having $T_{10\%}$(° C.) of 337° C. (corresponding to C2 in Table 1) measured according to an ASTM E2402 method was alternatively used as a phosphite-based compound, where a calculated value of Formula 1 was 0.62 and a calculated value of Formula 2 was 0.13. Measured physical properties were summarized in Table 2 below.

Examples 3-6

Experiments identical to Example 2 were performed, except that the amount (x) of the hindered phenol-based compound and the amount (y) of the phosphite-based compound were used as disclosed in Table 1. Measured physical properties were summarized in Table 2 below.

Example 7

An experiment identical to Example 1 was performed, except that ADK Stab AO-330 (corresponding to B2 in Table 1) having $T_{10\%}$(° C.) of 349° C. measured according to an ASTM E2402 method, as a hindered phenol-based compound, was used in an amount of 0.08 parts by weight (x), where a calculated value of Formula 1 is 0.75 and a calculated value of Formula 2 is 0.20. Measured physical properties were summarized in Table 2 below.

Comparative Examples 1 to 6

Experiments identical to Example 1 were performed, except that the amount (x) of the hindered phenol-based compound and the amount (y) of the phosphite-based compound were used as disclosed in Table 1 below. Measured physical properties were summarized in Table 2 below.

TABLE 1

| Item | Hindered phenol-based compound (x, parts by weight) | | Phosphite-based compound (y, parts by weight) | | Formula 1 | Formula 2 |
|---|---|---|---|---|---|---|
| | B1 | B2 | C1 | C2 | | |
| Example1 | 0.05 | | | 0.15 | 0.75 | 0.20 |
| Example2 | 0.05 | | | 0.08 | 0.62 | 0.13 |
| Example3 | 0.05 | | | 0.1 | 0.67 | 0.15 |
| Example4 | 0.05 | | | 0.15 | 0.75 | 0.20 |
| Example5 | 0.05 | | | 0.2 | 0.80 | 0.25 |
| Example6 | 0.05 | | | 0.25 | 0.83 | 0.30 |
| Example7 | | 0.05 | | 0.15 | 0.75 | 0.20 |
| Comparative Example1 | 0.2 | | | 0 | 0.00 | 0.20 |
| Comparative Example2 | 0.15 | | | 0.05 | 0.25 | 0.20 |
| Comparative Example3 | 0.1 | | | 0.1 | 0.50 | 0.20 |
| Comparative Example4 | 0 | | | 0.2 | 1.00 | 0.20 |
| Comparative Example5 | 0.01 | | | 0.02 | 0.67 | 0.03 |
| Comparative Example6 | 0.2 | | | 0.4 | 0.67 | 0.60 |

TABLE 2

| Item | haze | YI (280° C.) | YI (320° C.) | ΔYI | VOC (ppm) |
|---|---|---|---|---|---|
| Example 1 | 0.10 | 0.62 | 0.80 | 0.18 | 256.1 |
| Example 2 | 0.09 | 0.68 | 0.83 | 0.15 | 231.1 |
| Example 3 | 0.12 | 0.63 | 0.78 | 0.15 | 234.8 |
| Example 4 | 0.13 | 0.61 | 0.75 | 0.14 | 268.5 |
| Example 5 | 0.14 | 0.61 | 0.73 | 0.12 | 321.0 |
| Example 6 | 0.15 | 0.60 | 0.72 | 0.12 | 345.0 |
| Example 7 | 0.12 | 0.59 | 0.75 | 0.16 | 311.1 |
| Comparative Example 1 | 1.20 | 0.96 | 1.21 | 0.25 | 265.1 |
| Comparative Example 2 | 0.98 | 0.87 | 1.10 | 0.23 | 285.6 |
| Comparative Example 3 | 0.36 | 0.74 | 0.96 | 0.22 | 317.2 |
| Comparative Example 4 | 0.21 | 0.67 | 0.89 | 0.22 | 321.8 |
| Comparative Example 5 | 0.11 | 0.96 | 1.18 | 0.22 | 357.1 |
| Comparative Example 6 | 1.18 | 0.62 | 0.73 | 0.11 | 321.4 |

As shown in Table 2, when compared to Examples 1 to 7 satisfying Formula 1 and Formula 2, ΔYI in each of Comparative Examples 1 to 4 satisfying Formula 2 and not satisfying Formula 1 is greater than 0.21 and thereby yellow index difference is poor. In particular, it can be confirmed that transmittances of Comparative Examples 1 to 3, where Formula 1 is 0.6 or less and a hindered phenol-based compound was used in more amount than a phosphite-based compound, is greater than 0.2, and thereby yellow index difference and transmittance are poor.

In addition, it can be confirmed that ΔYI of Comparative Example 5, where Formula 2 is less than 0.05, of Comparative Examples 5 and 6 satisfying Formula 1 and not satisfying Formula 2, is greater than 0.21 and thereby yellow index is poor, and transmittance of Comparative Example 6, where Formula 2 is greater than 0.5, is greater than 0.2 and thereby transmittance is poor.

Additional Experimental Examples 1-5

Experiments identical to Example 1 were performed, except that the hindered phenol-based compound was substituted with Irganox 1076 (available from BASF Corp. and corresponding to B3 in Table 3) having $T_{10\%}$(° C.) of 291□ measured according to an ASTM E2402 method or Cyanox 425 (available from Cytec Industries Inc. and corresponding to B4 in Table 3) having $T_{10\%}$(° C.) of 268□ measured according to an ASTM E2402 method, and the phosphite-based compound was substituted with Irganox 168 (available from BASF Corp. and corresponding to C3 in Table 3) having $T_{10\%}$(° C.) of 271□ measured according to an ASTM E2402 method, ADK Stab PEP-36 (available from ADEKA Corp. and corresponding to C4 in Table 3) having $T_{10\%}$(° C.) of 286□ measured according to an ASTM E2402 method or Hostanox P-EPQ (available from Clariant International Ltd. and corresponding to C5 in Table 3) having $T_{10\%}$(° C.) of 258□ measured according to an ASTM E2402 method in amount ranges disclosed in Table 3 below. Measured physical properties were summarized in Table 4 below.

TABLE 3

| Item | Hindered phenol-based compound (x, parts by weight) | | | | Phosphite-based compound (y, parts by weight) | | | | | Formula 1 | Formula 2 |
|---|---|---|---|---|---|---|---|---|---|---|---|
| | B1 | B2 | B3 | B4 | C1 | C2 | C3 | C4 | C5 | | |
| Additional Experimental Example1 | | | 0.05 | | 0.15 | | | | | 0.75 | 0.20 |
| Additional Experimental Example2 | | | | 0.05 | 0.15 | | | | | 0.75 | 0.20 |
| Additional Experimental Example3 | 0.05 | | | | | | 0.15 | | | 0.75 | 0.20 |
| Additional | 0.05 | | | | | | | 0.15 | | 0.75 | 0.20 |

TABLE 3-continued

| Item | Hindered phenol-based compound (x, parts by weight) | | | | Phosphite-based compound (y, parts by weight) | | | | | For-mula 1 | For-mula 2 |
|---|---|---|---|---|---|---|---|---|---|---|---|
| | B1 | B2 | B3 | B4 | C1 | C2 | C3 | C4 | C5 | | |
| Additional Experimental Example 5 | 0.05 | | | | | | | | 0.15 | 0.75 | 0.15 |

TABLE 4

| Item | haze | YI (280° C.) | YI (320° C.) | ΔYI | VOC (ppm) |
|---|---|---|---|---|---|
| Additional Experimental Example 1 | 0.11 | 0.71 | 0.93 | 0.22 | 539.2 |
| Additional Experimental Example 2 | 0.14 | 0.74 | 0.96 | 0.22 | 592.9 |
| Additional Experimental Example 3 | 0.12 | 0.73 | 1.11 | 0.38 | 565.3 |
| Additional Experimental Example 4 | 0.12 | 0.65 | 0.82 | 0.17 | 518.8 |
| Additional Experimental Example 5 | 0.14 | 0.67 | 0.97 | 0.30 | 589.1 |

As shown in Table 4, when compounds having $T_{10\%}$(° C.) of less than 300□ as a hindered phenol-based compound or a phosphite-based compound are used in Additional Experimental Examples 1 to 5 satisfying conditions of Formulas 1 and 2, excessive gas generation occurs due to a VOC content of 500 ppm or more. In addition, the majority of Additional Experimental Examples exhibits a poor result such as ΔYI of greater than 0.21. Such a phenomenon is considered as being occurred by poor thermal stability through excessive gas consumption.

What is claimed is:

1. A polycarbonate resin composition comprising:
a polycarbonate resin,
a hindered phenol-based compound, and
a phosphite-based compound,
wherein the polycarbonate resin has an average molecular weight (Mw) in a range of 30,000 to 50,000 g/mol,
wherein both the hindered phenol-based compound and the phosphite-based compound have $T_{10\%}$(° C.), measured according to ASTM E2402 method, of 300° C. or more, respectively,
wherein the hindered phenol-based compound and the phosphite-based compound are comprised in a content range satisfying Formula 1 below and Formula 2 below based on 100 parts by weight of the polycarbonate resin:

$0.80 \leq y/(x+y) \leq 0.83$     [Formula 1]

$0.25 \leq x+y \leq 0.30$     [Formula 2]

wherein x is parts by weight of the hindered phenol-based compound and y is parts by weight of the phosphite-based compound,
wherein the hindered phenol-based compound is one or more selected from the group consisting of pentaerythritol tetrakis[3-(3,5-di-t-butyl-4-hydroxyphenyl)propionate] and 1,3,5-trimethyl-2,4,6-tris(3,5-di-t-butyl-4-hydroxy benzyl)benzene,
wherein the phosphite-based compound is one or more selected from the group consisting of bis(2,4-di-t-butylphenyl) pentaerythritol diphosphite and bis(2,4-dicumylphenyl)pentaerythritol diphosphite, and
wherein the polycarbonate resin composition has a total volatile organic compound (VOC, 300° C., 20 min) of 350 ppm or less.

2. The polycarbonate resin composition according to claim 1, wherein the composition is characterized in that a yellow index difference (ΔYI) measured with ASTM D1925 is 0.20 or less and a haze measured with ASTM D1003 is 0.20 or less, when the composition is measured at 280° C. and 320° C.

3. The polycarbonate resin composition according to claim 1, wherein the composition is characterized in that a yellow index difference (ΔYI) measured with ASTM D1925 is 0.10 to 0.20, and a haze measured with ASTM D1003 is 1.17 or less, when the composition is measured at 280° C. and 320° C.

4. The polycarbonate resin composition according to claim 1, wherein the composition is characterized in that a yellow index difference (ΔYI) measured with ASTM D1925 is 0.10 to 0.20.

5. The polycarbonate resin composition according to claim 1, wherein the composition is characterized in that a yellow index difference (ΔYI) measured with ASTM D1925 is 0.10 to 0.20 and a haze measured with ASTM D1003 is 1.17 or less, when the composition is measured at 280° C. and 320° C.

6. The polycarbonate resin composition according to claim 1, wherein the polycarbonate resin is an aliphatic or aromatic resin having a melt viscosity of 10 to 160 g/min.

7. The polycarbonate resin composition according to claim 1, wherein the composition comprises one or more additives selected from a lubricant, a light stabilizer, and an anti-hydrolysis agent.

8. The polycarbonate resin composition according to claim 1, wherein the composition is applied when injection molded or extrusion molded products are manufactured.

* * * * *